United States Patent [19]
Fletcher et al.

[11] Patent Number: 5,833,395
[45] Date of Patent: Nov. 10, 1998

[54] METHOD FOR REDUCING THE CONCENTRATION OF CONTAMINATING RADIOACTIVE MATERIAL IN CONTAMINATED SOIL

[75] Inventors: Paul A. Fletcher, Richardson; Brian E. Shannon, McKinney, both of Tex.

[73] Assignee: Atlantic Richfield Company, Los Angeles, Calif.

[21] Appl. No.: 842,351

[22] Filed: Apr. 24, 1997

[51] Int. Cl.$^6$ ............... B09C 1/00; G01V 5/00; G21F 9/00
[52] U.S. Cl. ............ 405/128; 250/255; 588/17; 588/261
[58] Field of Search ............ 134/42; 250/253, 250/255; 405/128, 129, 258; 588/1, 19, 261

[56] References Cited

U.S. PATENT DOCUMENTS

| | | | |
|---|---|---|---|
| 3,277,607 | 10/1966 | Overstreet | 588/17 X |
| 5,045,240 | 9/1991 | Skriba et al. | 588/7 |
| 5,429,454 | 7/1995 | Davis et al. | 405/128 X |
| 5,442,180 | 8/1995 | Perkins et al. | 250/367 |
| 5,613,238 | 3/1997 | Mouk et al. | 588/1 |
| 5,678,239 | 10/1997 | Davidson | 405/128 X |

OTHER PUBLICATIONS

NORM Orientation Outline, pp. 1–30 (undated).
Detection of Radium–226/Radium–228 Contamination in Soil and Other Solids at Levels of Regulatory Concern Using Field–Deployable Instrument, L. Max Scott, H. Miller, D. Van Gent, M. Hebert, S. Fauver, J. Courtney, 1996, pp. 21–33.
NORM Naturally Occurring Radioactive Material, What Is It and How Is BP Exploration Responding?, Jan. 1992, BP Exploration, pp. 1–16.

*Primary Examiner*—George Suchfield
*Attorney, Agent, or Firm*—F. Lindsey Scott

[57] ABSTRACT

A method for reducing the concentration of radioactive material in a contaminated area by removing contaminated soil from the contaminated area; determining a field survey specific activity concentration representative of the remaining soil in the contaminated area; comparing the field survey specific activity concentration with a field validation data set to determine the total concentration of contaminating radioactive material in the contaminated area and removing additional quantities of contaminated soil from the contaminated area as required. The soil area may alternatively be blended with clean soil to reduce the concentration of radioactive material in the soil or a combination of blending and removal may be used. A method for estimating the total concentration of radioactive material in a soil sample is provided.

20 Claims, No Drawings

METHOD FOR REDUCING THE CONCENTRATION OF CONTAMINATING RADIOACTIVE MATERIAL IN CONTAMINATED SOIL

BACKGROUND OF THE INVENTION

1. Field of the Invention

This invention relates to a method for reducing the concentration of contaminating radioactive material in a contaminated soil area by removing quantities of contaminated soil from the contaminated soil area or blending contaminated soil with clean soil to reduce the concentration of contaminating radioactive material in the contaminated soil area below a selected level.

2. Description of Related Art

In many oil field operations, naturally occurring radioactive material (NORM) (frequently $^{226}$Ra and $^{228}$Ra) is produced with fluids from subterranean formations. In many instances this material occurs as scale on the inside of piping or other vessels and the like. The concentration of this material in pipelines, in soils exposed to such subterranean fluids and the like can result in soil areas which are contaminated with radioactive material especially in areas where the pipe is stored or cleaned.

The contaminating radioactive materials frequently comprise $^{226}$Ra and $^{228}$Ra and various members of the decay series from these materials. Other radioactive materials may also be present. In recent years there has been increasing concern about soils contaminated with such radioactive materials. As a result many states have enacted laws which require that the concentration of radioactive material in soils be reduced to levels ranging from 2 to 30 picocuries per gram(pCi/g) above background for $^{226}$Ra or $^{228}$Ra. The requirement is that the concentration of the radioactive material in the soil be reduced to the selected or required level.

This is frequently accomplished by removing portions of the radioactive material contaminated soil and transporting it to a landfill, injecting it into a subterranean formation or the like. In other instances, it may be possible to blend the radioactive material contaminated soil with "clean" soil which contains radioactive material in concentrations below the required level. In such instances, the soils may be blended by dumping clean soil on the site and mixing it with the contaminated soil or by simply mixing a contaminated top soil with an uncontaminated or less contaminated subsoil layer. Such variations are known to those skilled in the art. In all such remedial treatments it is necessary to reduce the concentration of radioactive material below a specified level. The ability to closely control the cleanup process is limited by the long time requirement for the statutorily required radioactive material concentration analyses. In such analyses the soil containing the radioactive material is segregated and thereafter it is necessary to wait for secular equilibrium of the radioactive materials to be achieved. The time required is typically from about to 20 to 28 days. After secular equilibrium has been achieved a multi-channel laboratory analyzer is used to detect a spectrum of gamma ray radiation from the sample which is then interpreted to identify the types and the concentrations of radioactive materials in the soil sample.

When conducting a remediation operation involving removal or blending of soil it is difficult to proceed with any efficiency when it is necessary to wait 20 to 28 days for each analysis to determine whether sufficient soil has been removed or whether sufficient clean soil had been blended with the contaminated soil.

Accordingly, a continuing search has been directed to the development of an efficient method for reducing the concentration of radioactive material in soil to a level below a selected level.

SUMMARY OF THE INVENTION

According to the present invention, contaminated soil sites are remediated by a method for reducing the concentration of contaminating radioactive material in a contaminated soil area which has been contaminated with at least one contaminating radioactive material to a level below a selected level, comprising: removing a quantity of contaminated soil from the contaminated soil area; determining a field survey specific activity concentration representative of the remaining soil in the contaminated soil area and indicative of the concentration of a selected contaminating radioactive material in the remaining soil; comparing the field survey specific activity concentration with a field validation data set derived from a field deployed multi-channel analyzer indicative of the types and concentrations of contaminating radioactive materials in the contaminated soil area to determine the total concentration of contaminating radioactive material in the remaining soil in the contaminated soil area; and, removing additional quantities of contaminated soil from the contaminated soil area as required until a comparison of a field survey specific activity concentration for the remaining soil to the field validation data set indicates that the contaminating radioactive material concentration in the remaining soil has been reduced to a level below the selected level. The contaminated soil may be either removed or blended with "clean" soil to reduce the concentration of radioactive material in the contaminated soil area.

The present invention also comprises a method for estimating the concentration of contaminating radioactive material in selected contaminated soil samples from a contaminated soil area contaminated with at least one contaminating radioactive material by determining a field validation data set indicative of the types and concentrations of contaminating radioactive materials in contaminated soil in the contaminated soil area; determining a field survey specific activity concentration from a selected contaminated soil sample indicative of the concentration of a selected contaminating radioactive material; comparing the field survey specific activity concentration to the field validation data set to estimate the total concentration of contaminating radioactive materials in the selected contaminated soil sample; and updating the field validation data set by field deployable multichannel analyzer measurements of substantially all gamma ray emissions from selected contaminated soil samples from the contaminated soil area.

DESCRIPTION OF THE PREFERRED EMBODIMENTS

When naturally occurring radioactive material or other radioactive material is present in soil in quantities greater than permitted by regulatory agencies or in quantities greater than permitted by environmental and health considerations it is necessary to remediate the area to reduce the concentration of contaminating radioactive material. To return the site to a condition suitable for uncontrolled release of the land to general use it is frequently necessary to reduce the concentration of the contaminating radioactive material to a level below about 30 pCi/g. Such levels are required by many states. The levels of permissible concentration vary from state to state but requirements for the reduction of the concentration of contaminating radioactive material in such sites are wide spread. The radioactive material may be naturally occurring radioactive material from oil field operations or radioactive material from any other type operation which results in the contamination of the soil area with radioactive material.

In the remediation of such areas, the concentration of the contaminating radioactive material will normally be determined at various points in the contaminated area and possibly in surrounding areas. An evaluation may be made using a grid system. A radioactive material contaminated area is divided into a plurality of square grid sections for evaluation. A selected number of sections may be evaluated to determine the concentration of contaminating radioactive material in each section. If the contamination is relatively uniformly spread throughout the area then a relatively uniform treatment can be devised for the entire area. For instance, if the radioactive material is concentrated in the top two inches of the soil then it may be possible to remediate the area by simply removing the top two inches of soil for suitable disposal. The removed soil may be either replaced by clean soil, or if other factors permit, the site may simply be released to uncontrolled use of the land without replacement of removed topsoil.

Alternatively, if the radioactive material is found to a substantial depth it may be necessary to remove more soil and replace the soil with "clean" soil. Alternatively, if only the top two inches of soil is contaminated and the concentration of the radioactive material is relatively low it may be possible to simply disk or plow the area to blend the radioactive material contaminated topsoil with clean soil from a subsurface area to reduce the concentration of radioactive materials. It may be desirable in some instances to remove a portion of the contaminated soil from the area and blend remaining portions of the contaminated soil with "clean" soil to restore the land to a condition suitable for uncontrolled release. Such variations are well known to those skilled in the art.

In all such variations, it is necessary to frequently determine the concentration of radioactive material in the soil in the area. As discussed previously, full laboratory tests to determine the concentration of radioactive material in the soil can take from 20 to 28 days. This is a prohibitive long time for a test method to determine concentrations during continuing operations. It is highly desirable that a method be available for determining the concentration of radioactive material in soil quickly.

According to the present invention such a determination is made by determining a field survey specific activity concentration for a soil sample with the field survey specific activity concentration being indicative of the concentration of a single contaminating radioactive material in the soil. This determination is made by measuring the gamma ray emissions at a selected energy level from the sample for a selected time such as 5 minutes. The field survey specific activity concentration is then compared to a field validation data set indicative of the types and concentrations of contaminating radioactive materials in the contaminated soil area to obtain an estimate of all of the radioactive materials in the soil sample.

The field validation data set may be determined arbitrarily based upon the knowledge of similar radioactive material contaminated sites or by an analysis of a sample, based upon a detailed multichannel laboratory analyzer analysis or a field multichannel analyzer analysis of all or a part of the radioactive material contaminated area. In either case the concentration of contaminating radioactive material in samples is determined by comparing the field survey specific activity concentration to the field validation data set to determine the quantity of radioactive materials in the sample. This procedure does not yield a specific analysis but supplies an analysis with sufficient precision to determine whether the concentration of radioactive materials in the sample is less than the selected level.

As the cleanup proceeds in a given area there may be variations in the type and amount of radioactive material contained in the soil. This can reduce the accuracy of the determinations made by use of the field validation data set. Since the conditions may vary during any given remediation process it is highly desirable that a portable field unit multichannel analyzer be used to measure substantially all gamma ray emissions in periodic samples of the contaminated soil, blends of contaminated and clean soil or the remaining soil after the contaminated soil has been removed. This new data can be used to update the field validation data set periodically as the remediation proceeds. This updated field validation data set will yield more accurate results with respect to samples taken under conditions more comparable to the samples tested by the field unit multichannel analyzer instrument. Desirably, the field validation data set is updated periodically as the test proceeds. Preferably, the field survey specific activity concentrations are obtained using a single channel analyzer ratemeter scaler. A suitable instrument is a Ludlum Model No. 2200 scaler ratemeter connected to a Ludlum Model No. 44-2 high energy gamma ray detector. Desirably the scaler is adapted to selectively detect gamma rays in a selected energy waveband indicative of a single radioactive material.

Such analytical techniques in described "Detection of Radium-226/Radium-228 Contamination in Soil and Other Solids at Levels of Regulatory Concern Using Field-Deployable Instruments", L. Max Scott, H. Miller, D. Van Gent, M. Hebert, S. Fauver, and J. Courtney, Radiation Protection Management, Jan./Feb 1996.

The use of the single channel analyzer ratemeter scaler permits very quick measurement of the field survey specific activity concentration for a single radioactive element in the sample. $^{214}$Bi is a suitable element for the detection using the single channel analyzer.

By the method of the present invention when soil is removed or blended samples can be quickly measured to determine the field survey specific activity concentration and then referred to the field validation data set to determine the concentration of radioactive material remaining in the area of interest. Determination of the field survey specific activity concentration typically takes about 5 minutes. The comparison of the field survey specific activity concentration to the field validation data set typically requires from about 5 to about 30 minutes. By this technique information can be quickly obtained to determine whether more soil should be removed, whether the "clean" soil has substantial concentrations of radioactive material and the like. With such quick analytical controls, available remediation processes can be conducted to achieve the desired reduction in concentration of radioactive material in the radioactive material contaminated area with little delay for analytical results. With the use of a proper margin of error the use of the test techniques described above can be effective to determine whether additional soil should be removed, whether additional "clean" soil should be blended with radioactive material contaminated soil and the like to insure than an effective remediation is achieved.

In the practice of the present invention the soil may be either removed, blended with "clean" soil or a combination of both. Further the soil may be removed and/or treated in specific sections to a greater or lesser depth or extent than other sections depending upon the determination of the concentration of radioactive materials at the surface and at varying depths in each section. Such techniques are known to those skilled in the art but all such techniques are dependent upon analytical results at each step to confirm that the concentration of radioactive material has been reduced below a selected level.

The method of the present invention includes a method for quickly estimating the concentration of contaminating radioactive material by developing a field validation data set which may be developed arbitrarily, by the use of synthetic (produced) samples, or by measurement of conditions at the radioactive material contaminated area or the like and thereafter determining field survey specific activity concentration for selected soil samples which is indicative of the concentration of a selected contaminating radioactive material (such as $^{214}$Bi) and thereafter comparing the field survey specific activity concentration to the field validation data set to estimate the total concentration of contaminating radioactive materials in the sample and periodically updating the field validation data set by field deployable multichannel analyzer measurements of substantially all gamma ray emissions from selected contaminated soil samples from the contaminated soil area. This updating keeps the field validation data set current with respect to the ratios of radioactive materials contained in the radioactive material contaminated soil and the contaminated area in the vicinity of current operations. The field validation data set is thus maintained current in view of changing conditions. It is important that the field validation data set reflect accurately the ratio of different radioactive contaminating materials in the soil samples.

Having thus described the present invention by reference to certain of its preferred embodiments it is respectfully pointed out that the embodiments described are illustrative rather than limiting in nature and that many variations and modifications are possible within the scope of the present invention. Many such variations and modifications may be considered obvious and desirable by those skilled in the art based upon the foregoing description of preferred embodiments.

Having thus described the invention we claim:

1. A method for reducing the concentration of contaminating radioactive material in a contaminated soil area which has been contaminated with at least one contaminating radioactive material to a level below a selected level, the method comprising:
    a. removing a quantity of contaminated soil from the contaminated soil area;
    b. determining a field survey specific activity concentration representative of the remaining soil in the contaminated soil area and indicative of the concentration of a selected contaminating radioactive material in the remaining soil;
    c. comparing the field survey specific activity concentration with a field validation data set indicative of the types and concentrations of contaminating radioactive materials in the contaminated soil area to determine the concentration of contaminating radioactive material in the remaining soil in the contaminated soil area; and,
    d. removing additional quantities of contaminated soil from the contaminated soil area as required until a comparison of a field survey specific activity concentration for the remaining soil to the field validation data set indicates that the contaminating radioactive material concentration in the remaining soil has been reduced to a level below the selected level in the contaminated soil area.

2. The method of claim 1 wherein the field survey specific activity concentration is determined by measuring gamma ray emissions from the remaining soil with a single channel analyzer ratemeter scaler.

3. The method of claim 2 wherein gamma ray emissions of an energy; level indicative of a selected contaminating radioactive material are measured.

4. The method of claim 1 wherein the field validation data set is updated by field deployable multichannel analyzer measurements of substantially all gamma ray emissions from at least one of the contaminated soil and the remaining soil.

5. The method of claim 4 wherein the field validation data set is periodically updated.

6. The method of claim 1 wherein the quantity of contaminated soil removed is a topsoil layer to a selected depth.

7. The method of claim 1 wherein the contaminating radioactive material is naturally occurring radioactive material.

8. A method for reducing the concentration of contaminating radioactive material in a contaminated soil area which has been contaminated with at least one contaminating radioactive material to a level below a selected level, the method comprising:
    a. blending a quantity of contaminated soil in a contaminated soil area with a quantity of soil having a contaminating radioactive material concentration below the selected level to produce a blended soil in the contaminated soil area;
    b. determining a field survey specific activity concentration representative of the blended soil and indicative of the presence of a selected contaminating radioactive material;
    c. comparing the field survey specific activity concentration with a field validation data set indicative of the types and amounts of contaminating radioactive materials in the contaminated soil area to determine the concentration of contaminating radioactive material in the blended soil; and
    d. blending the blended soil with additional quantities of soil having a contaminating radioactive material concentration below the selected level as required until a field survey specific activity concentration for the blended soil indicates that the contaminating radioactive material concentration in the blended soil has been reduced to a level below the selected level.

9. The method of claim 8 wherein the field survey specific activity concentration is determined by measuring gamma ray emissions from the blended soil with a single channel analyzer ratemeter scaler.

10. The method of claim 9 wherein gamma ray emissions of an energy level indicative of a selected contaminating radioactive material are measured.

11. The method of claim 8 wherein the field validation data set is updated by field deployable multichannel analyzer measurements of substantially all gamma ray emissions from at least one of the contaminated soil and the blended soil.

12. The method of claim 11 wherein the field validation data set is periodically updated.

13. The method of claim 1 wherein the contaminated soil comprises a topsoil layer.

14. The method of claim 13 wherein the topsoil is blended with a subsurface soil having a contaminating radioactive material concentration below the selected level.

15. The method of claim 8 wherein a portion of the contaminated soil is removed.

16. The method of claim 8 wherein the contaminating radioactive material is naturally occurring radioactive material.

17. A method for estimating the concentration of contaminating radioactive material in selected contaminated soil samples from a contaminated soil area contaminated with at least one contaminating radioactive material, the method comprising:

a. determining a field validation data set indicative of the types and concentrations of contaminating radioactive materials in the contaminated soil in the contaminated soil area;

b. determining a field survey specific activity concentration from a selected contaminated soil sample indicative of the concentration of a selected contaminating radioactive material;

c. comparing the field survey specific activity concentration to the field validation data set to estimate the concentration of contaminating radioactive materials in the selected contaminated soil sample; and, d. updating the field validation data set by field deployable multichannel analyzer measurements of substantially all gamma ray emissions from selected contaminated soil samples from the contaminated soil area.

18. The method of claim 17 wherein the field survey specific activity concentration is determined by measuring gamma ray emissions from the selected contaminated soil sample with a single channel analyzer ratemeter scaler.

19. The method of claim 18 wherein gamma ray emissions of an energy level indicative of a selected contaminating radioactive material are measured.

20. The method of claim 19 wherein the contaminating radioactive material is $^{214}$Bi.

* * * * *